(12) United States Patent
Kim et al.

(10) Patent No.: US 9,807,312 B1
(45) Date of Patent: Oct. 31, 2017

(54) MOBILE TERMINAL

(71) Applicant: LG ELECTRONICS INC., Seoul (KR)

(72) Inventors: Jongpil Kim, Seoul (KR); Hakhae Kim, Seoul (KR); Dongjin Lee, Seoul (KR); Sungbum Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/214,218

(22) Filed: Jul. 19, 2016

(30) Foreign Application Priority Data

May 4, 2016 (KR) ........................ 10-2016-0055451

(51) Int. Cl.
*H04N 5/238* (2006.01)
*H04N 5/225* (2006.01)

(52) U.S. Cl.
CPC ........... *H04N 5/238* (2013.01); *H04N 5/2252* (2013.01); *H04N 5/2253* (2013.01); *H04N 5/2254* (2013.01); *H04N 5/2257* (2013.01)

(58) Field of Classification Search
CPC .... H04N 5/238; H04N 5/2252; H04N 5/2257; H04N 5/2254; H04N 5/2253; H04N 5/225–5/2259; G03B 9/02–9/07; G03B 7/00–7/006; G02B 5/005–5/006
See application file for complete search history.

(56) References Cited

U.S. PATENT DOCUMENTS

| | | | | |
|---|---|---|---|---|
| 7,771,132 B2 * | 8/2010 | Toyoguchi | ............... | G03B 9/14 396/463 |
| 2004/0062542 A1 * | 4/2004 | Watanabe | ................ | G03B 9/10 396/463 |
| 2004/0105028 A1 * | 6/2004 | Watanabe | ............ | H04N 5/2254 348/363 |
| 2005/0275740 A1 * | 12/2005 | Nagano | ................ | H04N 5/2254 348/335 |
| 2006/0244859 A1 | 11/2006 | Ji et al. | | |
| 2007/0077061 A1 * | 4/2007 | Watanabe | ............ | H04N 5/2254 396/493 |
| 2009/0052886 A1 * | 2/2009 | Watanabe | ............ | H04N 5/2254 396/486 |
| 2013/0121681 A1 | 5/2013 | Lee | | |

(Continued)

FOREIGN PATENT DOCUMENTS

JP  2005-215566 A  8/2005
KR  10-1999-00346 A  1/1999
(Continued)

*Primary Examiner* — Jason Flohre
(74) *Attorney, Agent, or Firm* — Birch, Stewart, Kolasch & Birch, LLP

(57) ABSTRACT

An iris of a mobile terminal includes a cover having a through hole therein and forming an internal space, a first blade disposed in the internal space and having a first through hole communicating with the through hole, a second blade disposed to overlap the first blade in at least a portion thereof within the internal space, communicating with the through hole, and having a second through hole formed to adjust a region in which light is incident through interference with the first through hole, and a link member connected to one end portion of each of the first and second blades and varying an aperture of the iris by moving at least one of the first and second blades.

17 Claims, 14 Drawing Sheets

(56) References Cited

U.S. PATENT DOCUMENTS

| | | | | |
|---|---|---|---|---|
| 2014/0099089 A1* | 4/2014 | Katano | ............... | G02B 7/102 |
| | | | | 396/55 |
| 2014/0125865 A1* | 5/2014 | Brest | ..................... | G03B 9/02 |
| | | | | 348/373 |
| 2017/0075193 A1* | 3/2017 | Masuzawa | ........ | H04N 5/2257 |

FOREIGN PATENT DOCUMENTS

| | | | |
|---|---|---|---|
| KR | 2005-215566 | A | 8/2005 |
| KR | 10-2005-0118356 | A | 12/2005 |
| KR | 10-2006-0109745 | A | 10/2006 |
| KR | 10-0714795 | B1 | 5/2007 |
| KR | 10-0884962 | B1 | 2/2009 |
| KR | 10-2013-0051638 | A | 5/2013 |

\* cited by examiner

MOBILE TERMINAL

CROSS-REFERENCE TO RELATED APPLICATION

Pursuant to 35 U.S.C. §119(a), this application claims the benefit of earlier filing dates and rights of priority to Korean Application No. 10-2016-0055451, filed on May 4, 2016, the contents of which are incorporated by reference herein in its entirety.

BACKGROUND OF THE INVENTION

1. Field of the Invention

The present disclosure relates to a mobile terminal having a camera module.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Unlike general cameras, a camera installed in a mobile terminal does not have a function of varying an aperture of an iris. That is, a camera module installed in a mobile terminal is manufactured to have an aperture value which is not varied but fixed.

Since the aperture value is fixed, users have difficulty in obtaining a desired image.

SUMMARY OF THE INVENTION

The present disclosure has been made to solve the above-mentioned problems occurring in the prior art and other problems.

Another aspect of the detailed description is to vary a diameter of an aperture of a camera module provided in a mobile terminal.

Another aspect of the detailed description is to provide a structure in which an additional circuit board is restrained from being exposed outwardly when a diameter of an aperture is varied.

To achieve these and other advantages and in accordance with the purpose of this specification, as embodied and broadly described herein, a mobile terminal may include: a terminal body; and a camera module provided on one side of the terminal body, the camera module including: a lens assembly, at least a portion of the lens assembly being exposed outwardly of the terminal body; an iris provided on an inner side of the lens assembly, the iris being configured to adjust an amount of incident light therethrough; and an image sensor provided on an inner side of the iris to convert the incident light passing through the iris into an electrical signal, wherein the iris comprises: a cover having a through hole therein, the cover defining an internal space; a first blade disposed in the internal space, the first blade having a first through hole; a second blade disposed to overlap the first blade at at least a portion thereof within the internal space, the second blade having a second through hole; and a link member connected to one end portion of each of the first blade and the second blade, the link member being configured to relatively move the first blade and the second blade between a first state and a second state to vary an aperture defined by the overlap of the first through hole and the second through hole, wherein the iris is in the first state when a current supply is cut off to the iris and is in the second state when current is supplied to the iris to change the aperture of the iris.

The iris may further include: a first magnet provided on one side of the first blade; a first coil provided to face the first magnet, the first coil being configured to move the first blade by an electromagnetic force generated between the first coil and the first magnet; a second magnet provided on one side of the second blade; and a second coil provided to face the second magnet, the second coil being configured to move the second blade by an electromagnetic force generated between the second coil and the second magnet.

The cover may include a first cover and a second cover coupled to each other to define the internal space, and wherein the iris further comprises a frame coupled to the first cover and the second cover in the internal space, the frame having a through hole formed therein, and the frame accommodating the first magnet and the second magnet, wherein the first blade, the second blade, the first magnet, the second magnet, the first coil, and the second coil are disposed between the first cover and the frame, and wherein the link member is disposed between the second cover and the frame.

The first blade may include a first extending portion having a third through hole, wherein the second blade includes a second extending portion having a fourth through hole, and wherein the link member includes a first protrusion portion penetrating through the third through hole and a second protrusion portion penetrating through the fourth through hole.

A first ball may be disposed between the second cover and the frame, the first ball is arranged to be in contact with one surface of the second cover and one surface of the frame.

The first blade may include a first long hole extending in a movement direction of the first blade, wherein the second blade has a second long hole extending in a movement direction of the second blade, and wherein the second cover includes a guide member formed on an inner surface of the second cover, the guide member being configured to impart a reciprocal movement to the first and second blades via engagement with the first long hole and the second long hole.

The first magnet and the second magnet may be disposed to be adjacent to the first long hole and the second long hole, respectively, without overlapping the first blade and the second blade.

An adjustment plate having a through hole formed therein and having a plate shape may be provided between the second cover and the first blade or the second blade.

The first cover may include a first curved hole and a second curved hole, the first curved hole and the second curved hole receiving the first protrusion portion and the second protrusion portion, respectively, of the link member.

The link member may include a third protrusion portion at a center of rotation of the link member, the third protrusion portion extending toward the first cover, and wherein the iris includes an elastic member having one end portion fixed to the third protrusion portion and another end portion fixed to the frame, the elastic member being configured to provide a restoring force to the link member.

A first circuit board may be provided in the internal space of the cover, the first circuit board having a hall sensor configured to sense movement of the first and second blades.

The mobile terminal may further includes: a first lens assembly provided on a front surface of the iris, the first lens assembly being exposed outwardly; a second lens assembly provided on a rear surface of the iris, the second lens assembly being configured to cooperate with the first lens assembly to adjust magnification of the camera module; and an actuator disposed on a rear surface of the second lens assembly, the actuator being configured to accommodate the iris.

The actuator may include the actuator comprises: a moving member having a through hole formed therein and having an internal space defined by a side wall; a third magnet provided on the side wall of the moving member; a housing provided to accommodate the moving member at the side wall, the housing having a through hole formed in a region corresponding to the third magnet; a third coil provided to face the third magnet in an internal region of the through hole of the housing, the third coil being configured to generate an electromagnetic force; and a second circuit board configured to supply power to the third coil.

The moving member, the iris, the first lens assembly and the second lens assembly may be configured to move together by an electromagnetic force generated by the third magnet and the third coil, wherein a first guide recess and a second guide recess are formed on an outer side wall of the moving member and an inner side wall of the housing, respectively, and wherein a second ball is provided between the first guide recess and the second guide recess such that, when the moving member moves, the second ball slidably moves between the first guide recess and the second guide recess.

The first circuit board may be branched to supply a current to the first coil and a current to the second coil.

The aperture of the iris may be configured to gradually change as a magnitude of a current applied to the first coil and the second coil is increased.

The iris may be configured such that directions of currents applied to the first coil and the second coil are opposite to each other.

The first blade and the second blade may be configured to relatively move when the link member rotates about a center of the link member.

To achieve these and other advantages and in accordance with the purpose of this specification, as embodied and broadly described herein, a mobile terminal may include: a terminal body; and a camera module provided on one surface of the terminal body, the camera module may include: a lens assembly provided on one side of the terminal body, at least a portion of the lens assembly being exposed outwardly of the terminal body; and an iris provided on a rear surface of the lens assembly, the iris being configured to adjust an amount of incident light therethrough, the iris including: a cover having a through hole therein, the cover defining an internal space; a first blade disposed in the internal space, the first blade having a first through hole communicating with the through hole of the cover; a second blade disposed to overlap the first blade at at least a portion thereof within the internal space, the second blade having a second through hole communicating with the through hole of the cover; a link member connected to one end portion of each of the first blade and the second blade, the link member being configured to vary an aperture of the iris defined by the overlap of the first through hole and the second through hole by moving at least one of the first blade and the second blade; and a link member driving unit configured to move the at least one of the first blade and the second blade by driving the link member.

The link member may include: a first link member connected to the first blade; and a second link member connected to the second blade, the first link member and the second link member being individually driven, and wherein the link member driving unit may include: a first magnet provided on one side of the first blade; a first coil provided to face the first magnet, the first coil being configured to move the first blade by an electromagnetic force generated between the first coil and the first magnet; a second magnet provided on one side of the second blade; and a second coil provided to face the second magnet, the second coil being configured to move the second blade by an electromagnetic force generated between the second coil and the second magnet.

The mobile terminal according to the present disclosure has the following advantages.

According to at least one of embodiments of the present disclosure, since the effective diameter of the iris is varied according to a VCM scheme, the camera module may be reduced in thickness.

According to at least one of embodiments of the present disclosure, since the long hole is formed in the blade, a weight of the blade may be reduced.

According to at least one of embodiments of the present disclosure, since the molded interconnected device (MID) is used as an iris circuit board, an electric circuit and an electronic component may be formed on a basic body three-dimensionally without a conventional board. In addition, when an electric circuit is directly integrated on a synthetic resin component, an innovative mechatronic assembly component may be effectively manufactured in addition to various advantages in terms of design.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
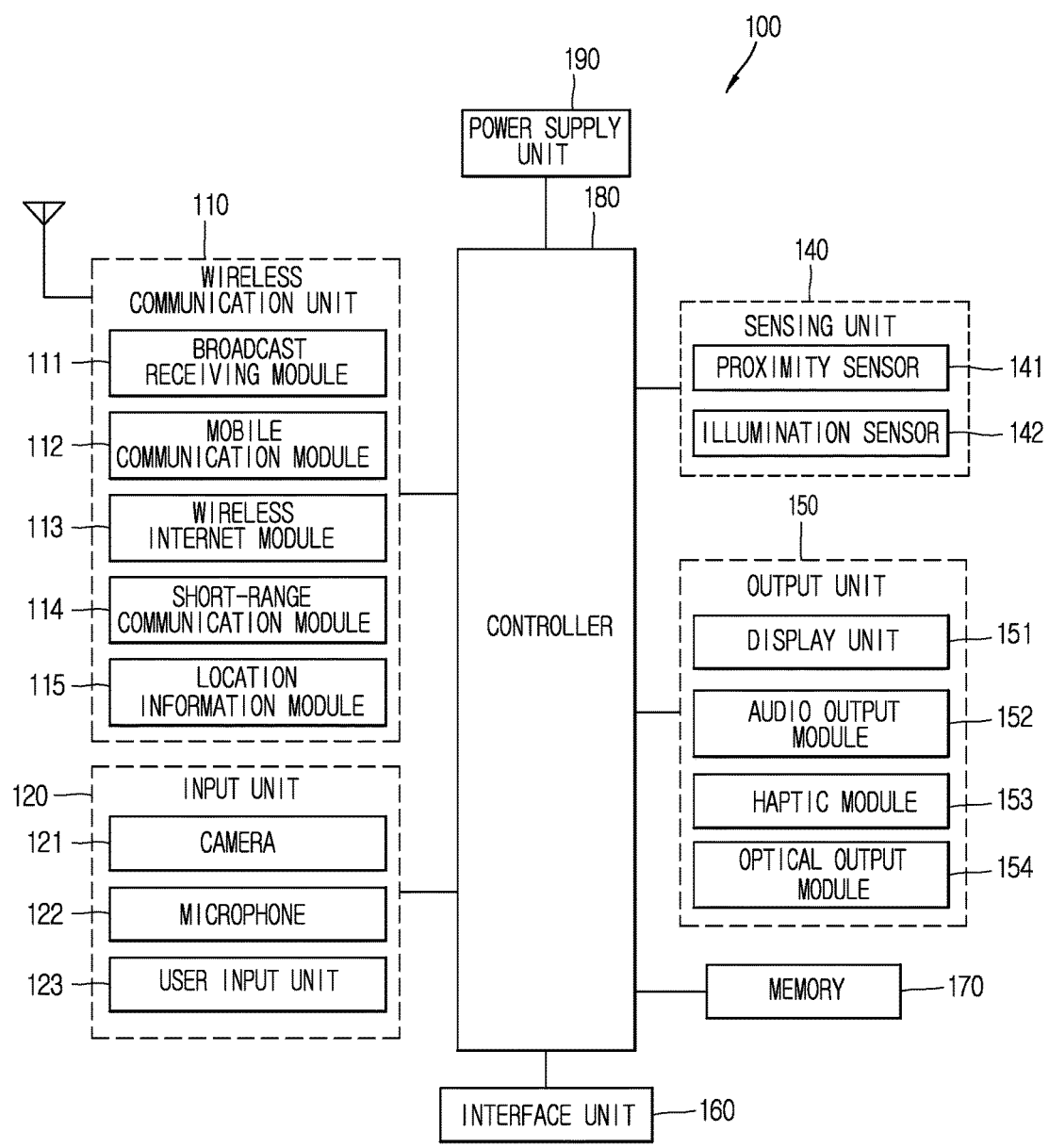
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
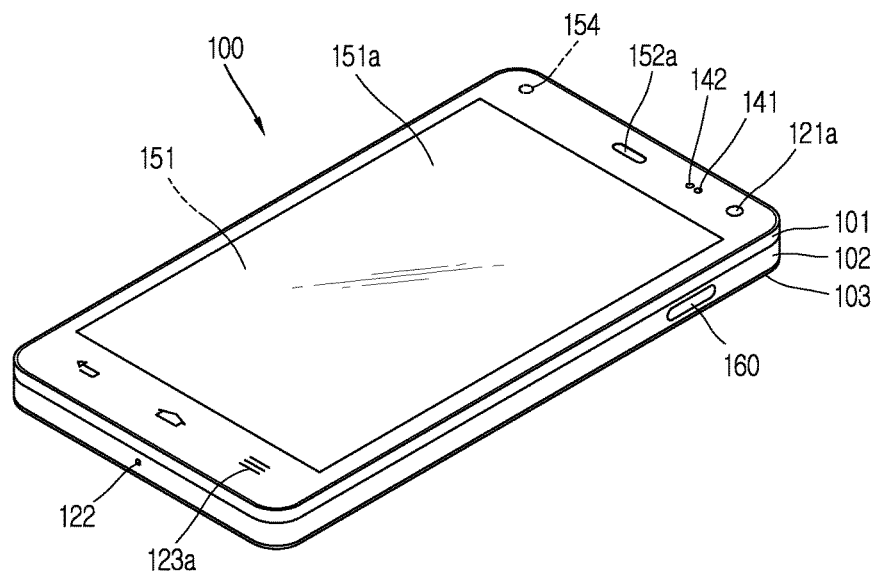
FIGS. 1B and 1C are conceptual views of one example of the mobile terminal, viewed from different directions.
Figure 1C:
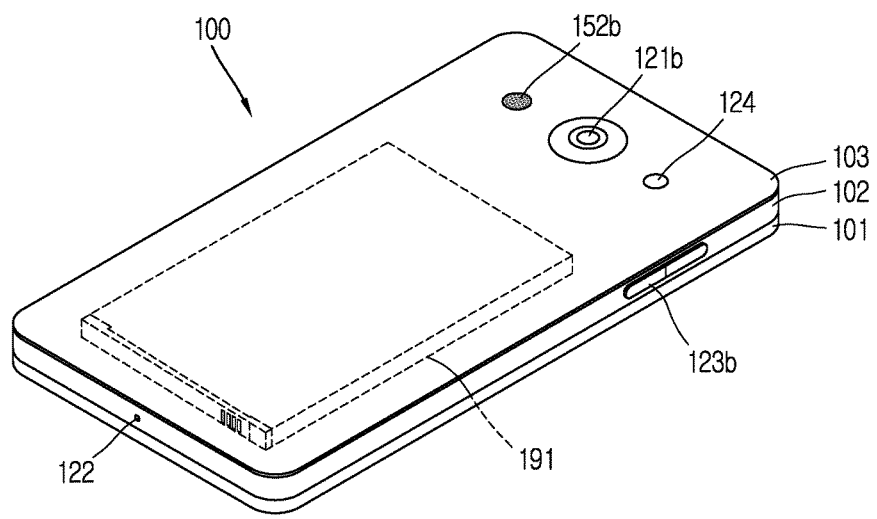

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a mobile terminal according to various embodiments to be explained later. The operation or the control method of the mobile terminal may be implemented on the mobile terminal by driving at least one application program stored in the memory 170.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

Also, when the touch sensor senses pressure applied to the touch screen, a stereoscopic touch (3D touch) may be possible according to a magnitude of the sensed pressure. For example, user inputs may be diversified according to strength of pressure applied to a specific region of the touch screen. That is, user inputs may be classified as strong pressing, slight pressing, deeply pressing, and the like, according to pressure applied to the touch screen, whereby various types of touch inputs may be applied.

In this manner, various functions such as execution of an application, termination, opening of a Web page, and the like, may be performed according to strength of pressure applied by the user, and when a touch input is continuously applied with preset pressure, a preset Web site may be connected.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a BLUETOOTH™ port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
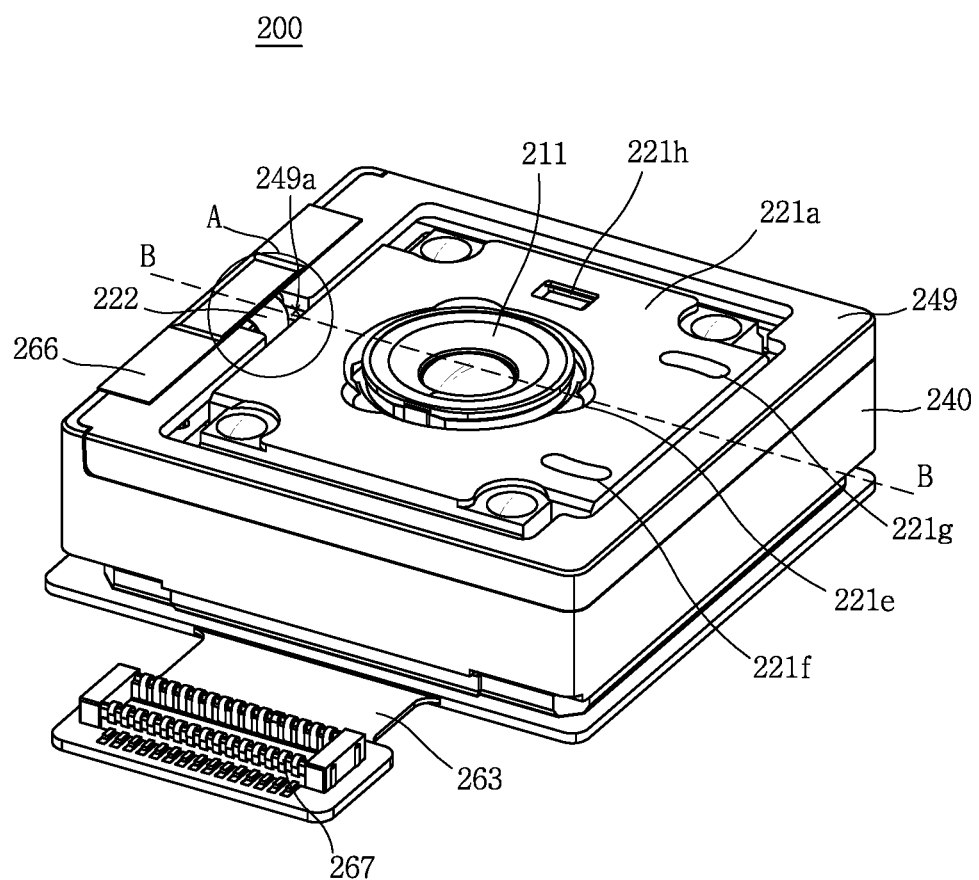
FIG. 2 is a perspective view of a camera module according to an embodiment of the present disclosure.
Figure 3:
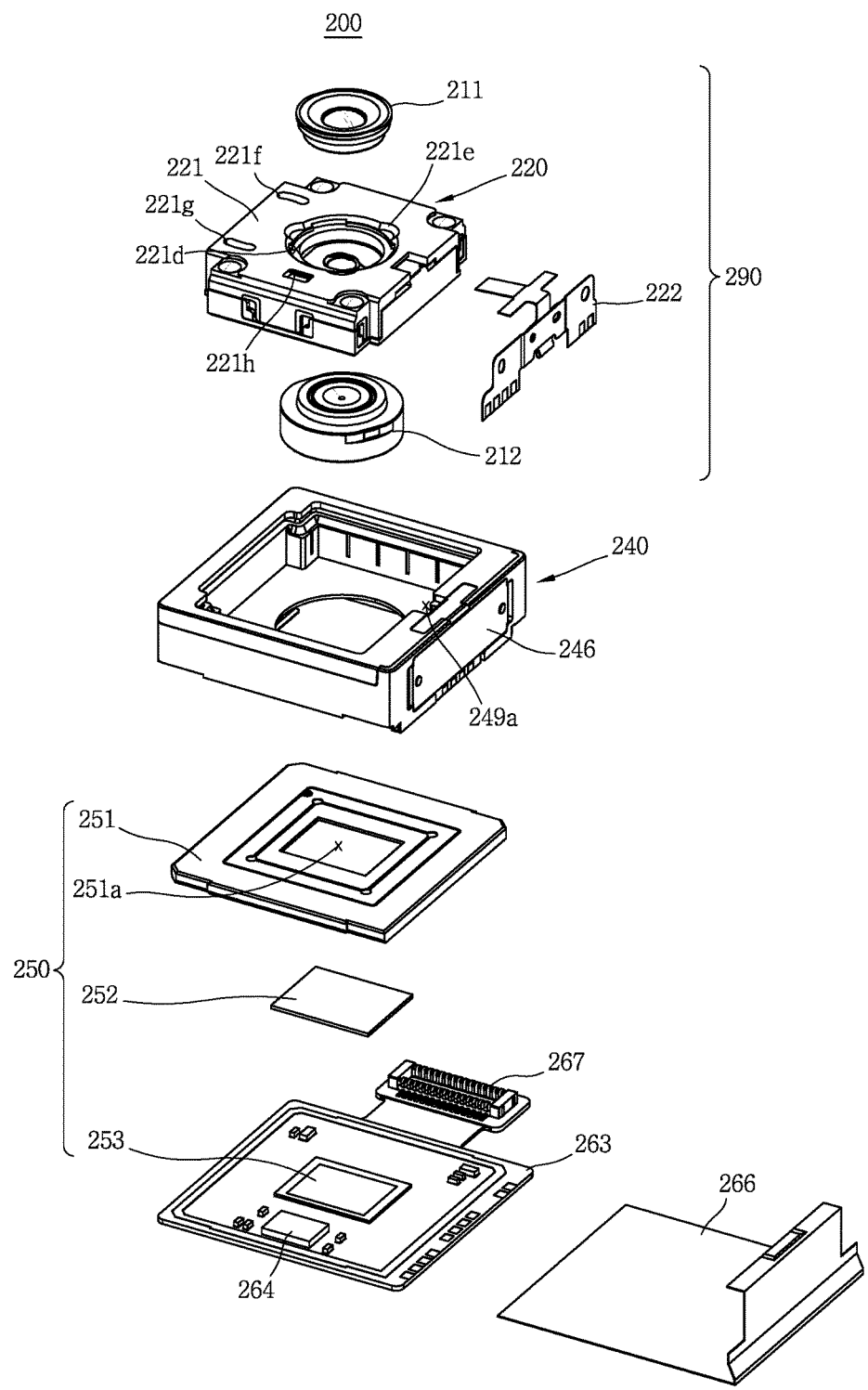
FIG. 3 is an exploded perspective view of the camera module of FIG. 2.
Figure 4:
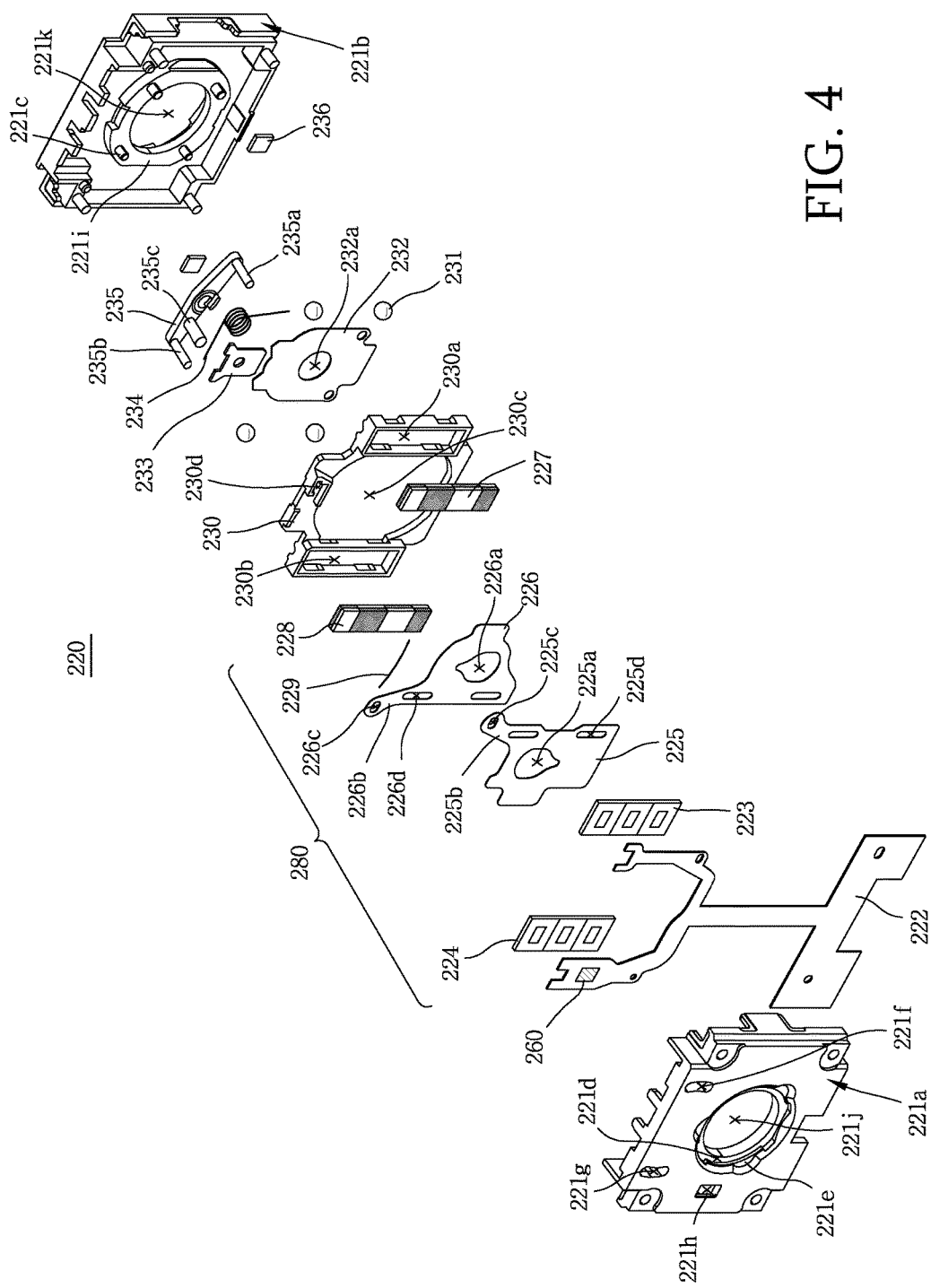
FIG. 4 is an exploded perspective view of an aperture according to an embodiment of the present disclosure.

FIG. 2 is a perspective view of a camera module 200 according to an embodiment of the present disclosure. FIG. 3 is an exploded perspective view of the camera module 200 of FIG. 2. FIG. 4 is an exploded perspective view of an iris 220 according to an embodiment of the present disclosure.

Hereinafter, a camera module 200 according to an embodiment of the present disclosure will be described with reference to FIGS. 2 to 4.

The camera module 200 may be formed to be exposed from a front surface or a rear surface of the mobile terminal 100. The camera module 200 may also be exposed from a side surface of the mobile terminal 100. Hereinafter, a case in which the camera module 200 is exposed from a rear surface will be largely described. However, the following descriptions may also be applied in the same manner when the camera module 200 is exposed from the front surface or the side surface of the mobile terminal 100.

When the camera module 200 according to an embodiment of the present disclosure is disposed to be exposed from the front surface of the mobile terminal 100, a portion of the camera module 200 exposed from the front surface of the mobile terminal 100 may be a front surface of the camera module 200 and an opposing surface thereof may be a rear surface. Also, when the camera module 200 is formed to be exposed from the rear surface of the mobile terminal, a portion of the camera module 200 exposed from the rear surface of the mobile terminal 100 will be referred to as a front surface of the camera module 200 and an opposing surface thereof will be referred to as a rear surface. That is, a portion of the camera module 200 exposed from the rear surface of the mobile terminal 100 is a front surface of the camera module 200 and an opposing surface is a rear surface of the camera module 200. This is termed on the basis of the camera module 200, which is the opposite in the mobile terminal 100.

The camera module 200 is provided on one side of the terminal body, and as illustrated in FIG. 3, the camera module 200 includes lens assemblies 211 and 212 in which at least a portion thereof is exposed to the outside, an iris 220 provided in a space between the lens assembly 211 and the lens assembly 212 and adjusting an amount of light incident to the camera module 200, and an image sensor 253 provided on an inner side of the camera module 200 and converting an optical signal incident through the iris 220 into an electrical signal.

The image sensor 253 converts an optical signal incident through the first lens assembly 211, the iris 220, the second lens assembly 212, and an infrared ray cut filter (IRCF) 252 into an electrical signal. Here, as the image sensor 253, a charge coupled device (CCD) or a complementary metal oxide semiconductor (CMOS) may be used.

Meanwhile, in an embodiment of the present disclosure, the camera module 220 includes a sensor module 250. The sensor module 250 includes the IRCF 252 and the image sensor 253 and is coupled to a lower surface of an actuator 240. The IRCF 252 is disposed between the iris 220 and the image sensor 253 and serves to allow visible ray of light incident from the outside and block infrared ray to be prevented from being transmitted to the image sensor 253. The IRCF 252 is attached to a sensor base 251 having a through hole 251a formed therein. The sensor module 250 may include or exclude the sensor base 251. In FIG. 3, it is illustrated that the sensor base 251 is included in the sensor module 250.

The sensor base 251 is attached to a lower surface of a housing 242 by a bonding member such as an adhesive tape 270.

An embodiment of the present disclosure provides a technique of varying a size of an aperture of the iris 220 in order to adjust an amount of light incident to the camera module 200. That is, an embodiment of the present disclosure relates to a technique of introducing the variable iris 220 to the mobile terminal 100. Hereinafter, an aperture of the iris 220 will be used as having the same meaning as an effective diameter of the iris 220.

In a related art general camera, in particular, a digital single lens reflex (DSLR) camera, a variable iris is installed and a driving control motor (not shown) is separately installed to operate the variable iris. Here, however, a weight of the camera is increased due to a weight of the driving control motor. Thus, application of the driving control motor to the mobile terminal 100 increases a weight of the mobile terminal 100, degrading portability of the mobile terminal 100.

An embodiment of the present disclosure, a variable iris 220 operated based on a voice coil motor (VCM) scheme. Since an effective diameter of the iris 220 is varied according to the VCM scheme, the camera module 200 may become thinner.

As illustrated in FIG. 4, in the iris 220 according to an embodiment of the present disclosure, a cover 221 including first and second covers 221a and 221b are provided to form an appearance. The first and second covers 221a and 221b are coupled in a facing manner to form an internal space. The cover 221 includes the first cover 221a facing a front side of the camera module 200 and the second cover 221b facing a rear side of the camera module 200. Through holes 221j and 221k are formed at internal centers of the first and second cover 221a and 221b, respectively. Light from the outside is incident through the through holes 221j and 221k, and an optical signal is input to the image sensor 253 (please refer to FIG. 3).

The iris 220 includes a pair of blades 225 and 226. Through holes 225a and 226a are formed within the blades 225 and 226, respectively. A size of an overlap region of the through holes 225a and 226a is varied according to movement of the pair of blades 225 and 226. Accordingly, an aperture of the iris 220 is changed. That is, the blades 225 and 226 include a first blade 225 disposed in an internal space formed by the first and second covers 221a and 221b and having the first through hole formed therein and a second blade 226 disposed to overlap at least a portion of the first blade 225 within the cover 221 and having the second through hole 226a formed therein to adjust a region to which light is incident through interference (disposition structure) with the first through hole 225a. An aperture of the iris 220 is varied by adjusting a size of an overlap region of the first and second through holes 225a and 226a. Here, there is no need to provide two blades, and one blade may be provided and a structure thereof is not particularly limited as long as a size of a through hole formed in the blade is varied by moving the blade.

Figure 5A:
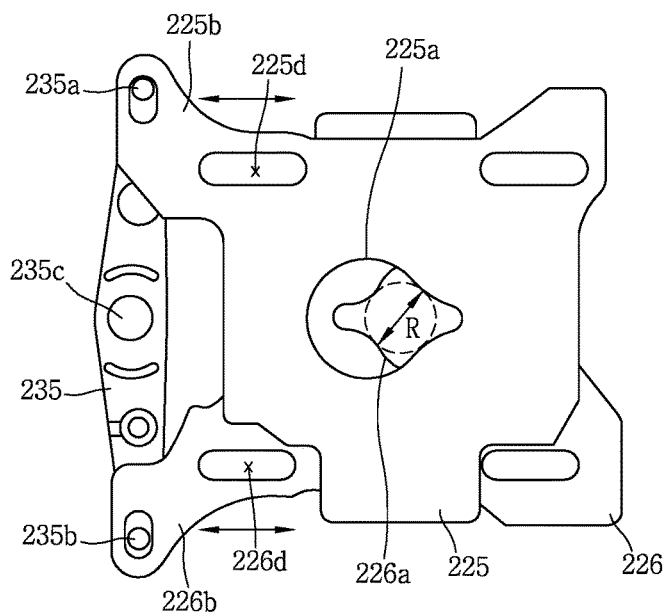
FIGS. 5A and 5B are views illustrating a state in which first and second blades are connected to a link member according to an embodiment of the present disclosure.
Figure 5B:
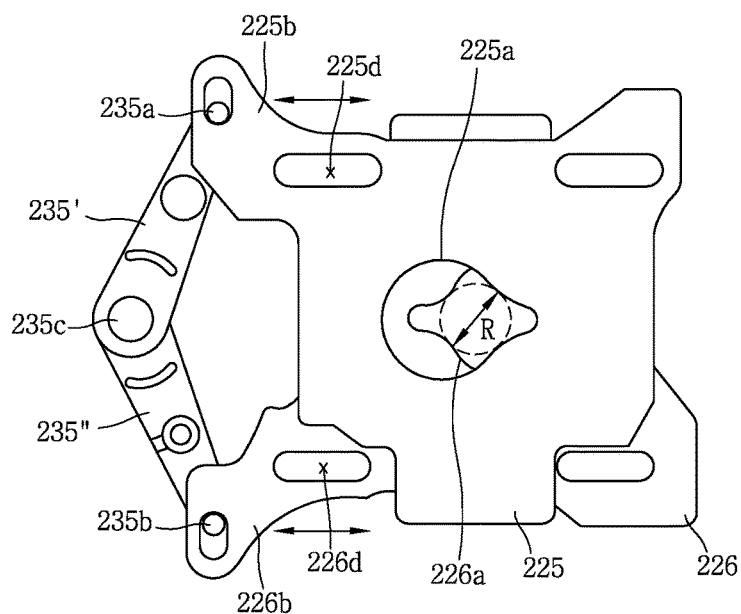
Figure 6:
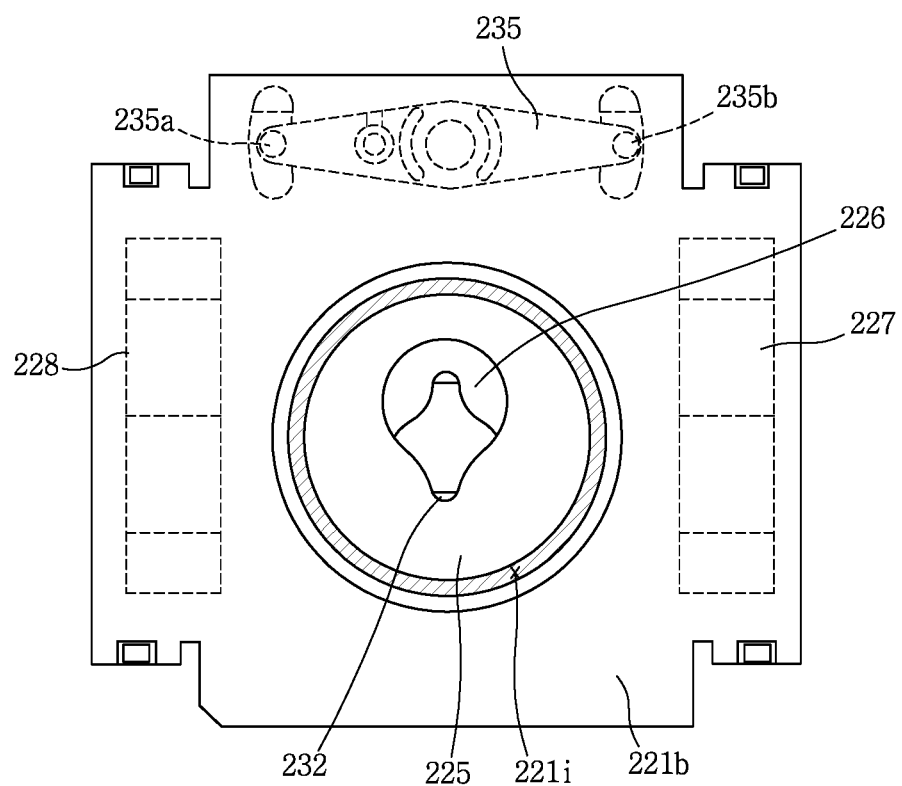
FIG. 6 is a view illustrating a state in which components illustrated in FIG. 4 are coupled, viewed from a rear side.

FIGS. 5A and 5B are views illustrating a state in which the first and second blades 225 and 226 are connected to a link member 235 according to an embodiment of the present disclosure. FIG. 6 is a view illustrating a state in which components illustrated in FIG. 4 are coupled, viewed from a rear side. FIGS. 7A to 7D are views illustrating a change in an aperture of the iris 220 according to an embodiment of the present disclosure.

As illustrated in FIGS. 5A and 5B, the link member 235 varying a size of the region in which light is incident by relatively moving the first and second blades 225 and 226 in mutually opposite directions is connected to one end portions of the first and second blades 225 and 226. The first and second blades 225 and 226 relatively move in mutually opposite directions, and through this operation, the size of the effective diameter R of the iris 220 formed by the first and second through holes 225a and 226a is changed.

The first and second blades 225 and 226, spaced apart from one another, are disposed to be parallel to each other and changed in state according to whether a current is applied. A state in which a power supply is cut off will be referred to as a first state and a state in which a current is supplied and a size of a region to which light is incident is changed will be referred to as a second state. That is, the first state refers to an initial state of the variable iris 220, and the second state refers to a state in which a size of the aperture of the iris 220 has been changed according to supply of a current. In the first state, the aperture of the iris 220 may be largest, and as magnitude of the applied current is increased, the size of the aperture of the iris 220 may be gradually decreased. Conversely, the second state may also be referred to as a state in which the aperture of the iris 220 is the largest and the first state may be referred to as a state in which the aperture of the iris 220 is changed to be gradually decreased.

Alternatively, the first state may be understood as a state in which the iris 220 is fully opened, and the second state may be understood as a state in which at least a portion of the iris 220 is closed. Here, in order to maintain the state in which the iris 220 is fully opened, a core 236 provided on an inner surface of the second cover 221b may be disposed.

Figure 7A:
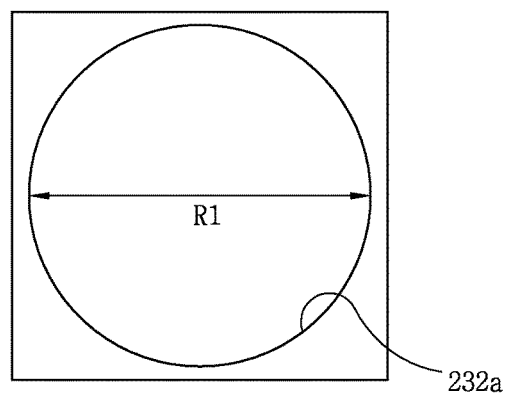
FIGS. 7A to 7D are views illustrating a change in an aperture of an iris according to an embodiment of the present disclosure.

Here, it is assumed that the first state refers to an initial state in which a current is not applied to the iris 220 and a size of an aperture R1 of the iris 220 has been changed. In an embodiment of the present disclosure, the second state is a state changing according to the aperture of the iris 220, and thus, the second state does not indicate only a fixed single state but various states. That is, any other state than the initial state may be the second state. FIG. 7A illustrates the first state, and FIGS. 7B to 7D illustrate the second state, in which states that an effective diameter of the iris 220 is gradually decreased are sequentially illustrated.

Figure 7B:
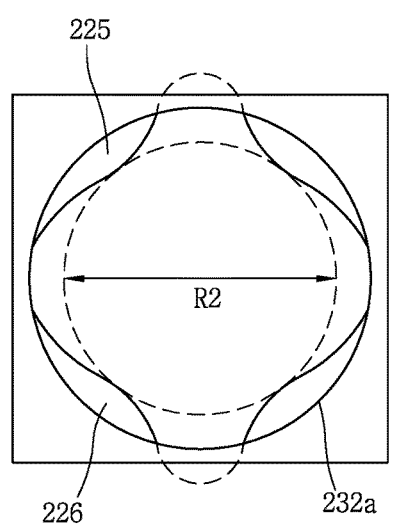
Figure 7C:
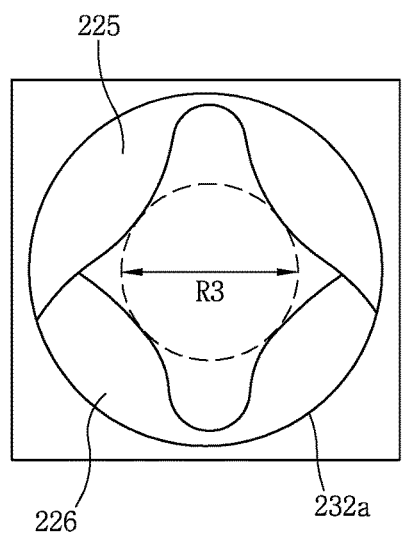
Figure 7D:
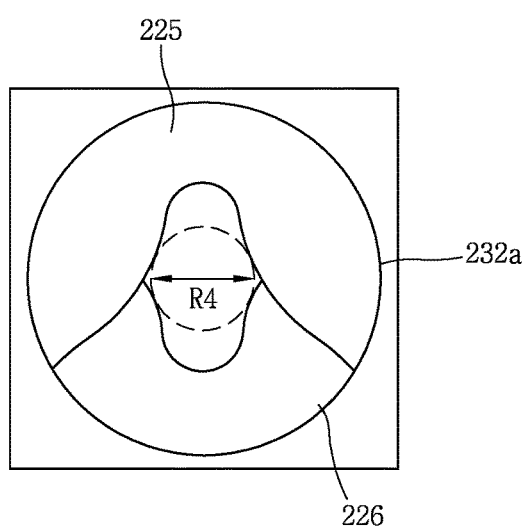

Here, as illustrated in FIGS. 7B to 7D, an effective diameter of the iris 220 is a diameter of an inscribed circle of a region formed by the first and second through holes 225a and 226a. Thus, after a size of the effective diameter of the iris 220 is changed from R1 to R2 as the first state is changed into the second state, when a magnitude of a current is continuously increased, the size of the effective diameter of the iris 220 is changed from R2 to R3, and thereafter, from R3 to R4.

Meanwhile, a maximum effective diameter of the iris 220 is formed to be smaller than R1. That is, as illustrated in FIG. 4, an adjustment plate 232 is provided on one side of the first and second blades 225 and 226, and a through hole 232a is formed at an internal center of the adjustment plate 232. A size of the effective diameter of the iris 220 formed by the first and second through holes 225a and 226a is limited by the through hole 232a. In detail, sizes of the first and second through holes 225a and 226a may be formed to be greater than the through hole 232a. The first and second blades 225 and 226 relatively move so the effective area of the iris 220 is gradually increased or decreased, as illustrated in FIGS. 6 to 7D, the size of the effective diameter of the iris 220 is dually limited by the region formed by the first and second through holes 225a and 226a and the through hole 232a formed in the adjustment plate 232. In other words, even though a region formed by the first and second through holes 225a and 226a is gradually increased according to relative movement of the first and second blades 225 and 226, the effective diameter of the iris 220 may not be greater than the through hole 232a formed by the adjustment plate 232.

In an embodiment of the present disclosure, the first and second blades 225 and 226 are moved by electromagnetic force generated by a coil and a magnet, and to this end, the iris 220 includes a pair of magnets 227 and 228 and a pair of coils 223 and 224. The pair of magnets 227 and 228 includes a first magnet 227 provided on one side of the first blade 225 and a second magnet 228 provided on one side of the second blade 226. The pair of coils 223 and 224 may include a first coil 223 formed to face the first magnet 227 and moving the first blade 225 by an electromagnetic force generated between the first coil 223 and the first magnet 227 and a second coil 224 formed to face the second magnet 228 and moving the second blade 226 by an electromagnetic force generated between the second coil 224 and the second magnet 228.

The first and second coils 223 and 224 and the first and second magnets 227 and 228 drive the link member 235, and thus, the first and second coils 223 and 224 and the first and second magnets 227 and 228 may be collectively referred to as a link member driving unit 280. Also, since the first and second coils 223 and 224 and the first and second magnets 227 and 228 drive the first and second blades 225 and 226, the first and second coils 223 and 224 and the first and second magnets 227 and 228 may be collectively referred to as a blade driving unit.

The sum of thicknesses of the first and second blades 225 and 226 may be thinner than a thickness of each of the first and second magnets 227 and 228, and the first and second magnets 227 and 228 are disposed on one side of the first and second blades 225 and 226. In detail, the first and second magnets 227 and 228 are disposed to be adjacent to long holes 225d and 226d formed in the first and second blades 225 and 226, respectively, and disposed not to overlap the first and second blades 225 and 226. Accordingly, an increase in a thickness of the iris 220 may be prevented. Also, since the long holes 225d and 226d are formed in the first and second blades 225 and 226, respectively, weights of the first and second blades 225 and 226 may be advantageously reduced.

The first blade 225 is moved by an electromagnetic force generated between the first coil 223 and the first magnet 227, and the second blade 226 is moved by an electromagnetic force generated between the second coil 224 and the second magnet 228. Here, the electromagnetic force generated between the first coil 223 and the first magnet 227 will be referred to as a first electromagnetic force, and the electromagnetic force generated between the second coil 224 and the second magnet 228 will be referred to as a second electromagnetic force.

Movement directions of the first blade 225 and the second blade 226 need to be the opposite to each other, and thus, a direction of the first electromagnetic force generated between the first coil 223 and the first magnet 227 and a direction of the second electromagnetic force generated between the second coil 224 and the second magnet 228 should be the opposite to each other. To this end, directions of currents respectively applied to the first coil 223 and the second coil 224 need to be the opposite to each other. Also, according to circumstances, in order to form the first electromagnetic force and the second electromagnetic force in the mutually opposite directions, currents may be applied to the first and second coils 223 and 224 in the same direction, and the first and second magnets 227 and 228 may be disposed differently. For example, unlike the case of FIG. 4, the positions of the first coil 223 and the first magnet 227 may be interchanged.

Since the first and second blades 225 and 226 and the first and second coils 223 and 224 are formed to have a small thickness and since the first and second magnets 227 and 228 are disposed to be adjacent, the first electromagnetic force and the second electromagnetic force may affect each other. In order to prevent this, in an embodiment of the present disclosure, the first and second coils 223 and 224 and the first and second magnets 227 and 228 are disposed in consideration of coefficients of induction and the number of windings of the first and second coils 223 and 224, thicknesses, coefficients of self-induction, and sizes of Gauss of the first and second magnets 227 and 228, and a space between the first and second magnets 227 and 228, and the first and second coils 223 and 224 and the first and second magnets 227 and 228 are disposed in positions where interference between the first electromagnetic force and the second electromagnetic force is minimized.

Alternatively, the first coil 223 and the first magnet 227 may be disposed to be more adjacent to the first blade 225 than to the second blade 226 and the second coil 224 and the second magnet 228 may be disposed to be more adjacent to the second blade 226 than to the first blade 225. In this manner, by disposing the components generating the first electromagnetic force to be more adjacent to the first blade 225 and the components generating the second electromagnetic force to be more adjacent to the second blade 226, interference between the first and second electromagnetic forces may be restrained.

Also, the cover 221 include first and second covers 221a and 221b coupled to form an internal space, and a frame 230 is formed in the internal space. The frame 230 is coupled to the first and second covers 221a and 221b, has a through hole 230c, and accommodates the first and second magnets 227 and 228. The frame 230 has a predetermined thickness, and first and second magnet accommodation portions 230a and 230b are formed to be recessed on both side portions of the frame 230 in order to accommodate the first and second magnets 227 and 228, respectively. The first and second magnet accommodation portions 230a and 230b may be formed to have a height similar to a thickness of each of the first and second magnets 227 and 228.

Between the first cover 221 and the frame, the first and second blades 225, 226, the first and second magnets 227 and 228, and the first and second coils 223 and 224 are disposed, and between the second cover 221b and the frame 230, the link member 235 is disposed. The link member 235 may be formed to be rotate about a rotational shaft, and the first and second blades 225 and 226 are coupled to both sides of the link member 235.

In detail, the first and second blades 225 and 226 are formed to have a main surface having a predetermined area. That is, the main surfaces of the first and second blades 225 and 226 refer to a great part of regions excluding the through holes 225a and 226a. The first and second blades 225 and 226 have first and second extending portions 225b and 226b, respectively, formed to extend from one sides of the first and second through holes 225a and 226a and have a narrower width. The first and second extending portions 225b and 226b are formed on the opposite side of the main surfaces of the first and second blades 225 and 226 in relation to a movement direction of the first and second blades 225 and 226. Third and fourth through holes 225c and 226c are formed in the first and second extending portions 225b and 226b, respectively. Here, the third and fourth through holes 225c and 226c are formed at end portions of the first and second extending portions, respectively.

First and second protrusion portions 235a and 235b are formed in portions of the link member 235 corresponding to the third and fourth through holes 225c and 226c in order to penetrate through the third and fourth through holes 225c and 226c, respectively. End portions of the first and second protrusion portions 235c and 235b are inserted into long holes 221f and 221g having a predetermined curvature formed in the cover 221a and moved therein. The reason for forming the long holes 221f and 221g to have a predetermined curvature is because the link member 235 rotates in relation to a rotational shaft so a region drawn by the first and second protrusion portions 235a and 235b make a portion of a circumference of the link member 235.

Also, a third protrusion portion 235c protruding toward the first cover 221a is formed in a portion as a center of rotation of the link member 235 and a boss is formed on one surface of the first cover 221a facing the link member 235, and thus, the third protrusion portion 235c is insertedly fixed to the boss. That is, the first to third protrusions 235a, 235b, and 235c protrude toward the first cover 221a from the link member 235, and the first and second protrusion portions 235a and 235b rotate about the third protrusion portion 235c. A link member cover 233 is provided on one surface of the link member 235, and the camera core 236 is provided on the second cover 221b.

Here, the rotational shaft of the link member 235 is not necessarily the center of the link member 235. That is, the third protrusion portion 235c may not be necessarily positioned at the center between the first and second protrusion portions 235a and 235b and may be positioned in any portion at least between the first and second protrusion portions.

Also, the first and second blades 225 and 226 may be relatively moved in mutually opposite directions, and here, the first and second blades 225 and 226 may not necessarily move simultaneously. That is, the link member 235 may be coupled to only any one of the first and second blades 225 and 226, without being coupled to the other, and may move only the coupled blade to obtain the same effect as that of the case in which the first and second blades 225 and 226 relatively move. For example, the link member 235 may be connected to the first blade 225 and the second blade 226 may be fixed to a component forming the iris 220 such as the cover 221. In this case, only the first coil 223 and the first magnet 227 may be included in the link member driving unit 280 for driving the first blade 225, while the second coil 224 and the second magnet 228 may not be necessary.

In addition, as illustrated in FIG. 5B, the first and second blades 225 and 226 may be connected to a pair of link members 235' and 235", rather than being connected to both sides of the single link member 235. Here, the first coil 223 and the first magnet 227 drive the first link member 235', and the second coil 224 and the second magnet 228 may drive the second link member 235". In such a case, the first and second link members 235" may be individually driven by the controller 180. Also, fixed end portions of the first and second link members 235' and 235" may be fixed to different protrusion portions or may be fixed together to the same protrusion portion 235c.

A first ball 231 is disposed between the second cover 221b and the frame 230 to facilitate movement of the frame 230. The first ball 231 may be provided in plurality, and in an embodiment of the present disclosure, four first balls 231 are illustrated. The first ball 231 is provided between the frame 230 and the second cover 2212b, and after the iris 220 is assembled, the first ball 231 is formed to be tightly in contact with a rear surface of the frame 230 and a front surface of the second cover 221b. Through this structure, a step (a distance) generated between the frame 230 and the second cover 221b may be adjusted, while the frame 230 is supported. Without the first ball 231, the frame 230 may not be supported due to an empty space between the frame 230 and the second cover 221b.

The adjustment plate 232 having a plate shape with the through hole 232a formed therein is provided between the second cover 221b and the first blade 225 or the second blade 226. The adjustment plate 232 serves to block an electromagnetic force generated between the first and second coils 223 and 224 and the first and second magnets 227 and 228. That is, the adjustment plate 232 serves as a yoke.

Also, as described above, a function of setting a maximum value of the aperture of the iris 220 based on interference of the first and second through holes 225a and 226a respectively formed in the first and second blades 225 and 226 may be performed. This will be described in detail hereinafter.

FIGS. 5A and 5B are views illustrating a state in which an effective diameter of the iris 220 is changed according to a movement of the first and second blades 225 and 226 according to an embodiment of the present disclosure, FIG. 6 is a view illustrating a mechanism for driving the first and second blades 225 and 226 according to an embodiment of the present disclosure in a state in which some components are added to FIG. 5A, and FIGS. 7A to 7D are views illustrating a state in which an effective diameter of the iris 220 according to an embodiment of the present disclosure is changed. Referring to FIGS. 5A to 7D, a size of an effective diameter of the iris 220 is varied by changing a degree to which the first and second through holes 225a and 226a overlap.

That is, as illustrated in FIGS. 5A and 5B, when the first blade 225 moves rightward and the second blade 226 moves leftward, the size of the effective diameter R of the iris 220 formed by the first and second through holes 225a and 226a are gradually increased. Meanwhile, when the first blade 225 moves leftward and the second blade 226 moves rightward, the size of the effective diameter of the iris 220 formed by the first and second through holes 225a and 226a is gradually decreased. In this connection, referring to FIGS. 7A to 7D, the through hole 232a of the adjustment plate 232 is not covered at all by the first and second blades 225 and 226. In this state, the interior of the through hole 232a is entirely empty.

Here, the effective diameter R1 of the iris 220 is equal to a diameter of the through hole 232a formed in the adjustment plate 232. However, the through hole 232a formed in the adjustment plate 232 does not necessary have a circular shape. When a current applied to the first and second coils 223 and 224 is gradually increased, the sizes of the effective diameters R2, R3, and R4 of the iris 220 are gradually decreased as illustrated in FIGS. 7B to 7D, and FIG. 7D illustrates a state in which the size of the effective diameter R4 of the iris 220 is the smallest. Here, in an embodiment of the present disclosure, the effective diameter of the iris 220 refers to a diameter of an inscribed circle of a region formed by the first and second through holes 225a and 226a. For example, an effective diameter of the iris 220 in FIG. 7C is R3. Here, light incident to a region other than the region of the effective diameter is neglected.

Also, as illustrated in FIG. 4, a first circuit board 222 is provided in the internal space of the cover 221, and a hall sensor 260 sensing movement of the first and second blades 225 and 226 is provided on the first circuit board 222. A magnetic member generating a change in a magnetic field sensed by the hall sensor 260 may be disposed in a vicinity of the hall sensor 260. The first circuit board 222 may be a flexible printed circuit board (FPCB), and in order to supply a current to each of the first and second coils 223 and 224, the first circuit board 222 is branched to be formed. The first and second coils 223 and 224 may be formed as being printed on a board or may be wound. In an embodiment of the present disclosure, a form of a flat coil printed on a board is illustrated. Since the first and second coils 223 and 224 are formed as flat coils, a small amount of coils may be stably implemented.

The first circuit board 222 controls the iris 220, and thus, the first circuit board 222 may be termed an iris circuit board (i.e., a circuit board for an iris).

Meanwhile, in an embodiment of the present disclosure, in order to outwardly dissipate heat generated by the hall sensor 260, a through hole 221h is formed in the first cover 221a.

Also, in an embodiment of the present disclosure, in a state in which a current is applied to the first and second coils 223 and 224, when the current supply is stopped, the first and second blades 225 and 226 are returned to their original positions. To this end, elastic members 229 and 234 providing restoring force to the link member 235 to rotate the link member 235 is provided. The first and second elastic members 229 and 234 may be implemented as suspension wires or springs, and any material may be used to form the elastic members 229 and 234 as long as it has restoring force. For example, the elastic members 229 and 234 may be torsion springs, coil springs, or leaf springs.

Among the elastic members 229 and 234, one end portion of a first elastic member 229 is fixed to the third protrusion portion 235c and the other end portion thereof is fixed to the frame 230. That is, the third protrusion portion 235c is formed to penetrate through the through hole 230d formed in the frame 230, and in a state in which the third protrusion portion 235c penetrates through the through hole 230d, one end portion of the first elastic member 229 is fixed to an end portion of the third protrusion portion 235c. When the link member 235 rotates about the third protrusion portion 235c, restoring force is generated in the link member 235 by the first elastic member 229.

Among the elastic members 229 and 234, a second elastic member 234 may be a sort of torsion spring. One side of the second elastic member 234 is inserted into the third protrusion portion 235c, and the other side thereof is caught by a structure within the iris 220, providing restoring force when the link member 235 rotates.

That is, when a current is applied to the first and second coils 223 and 224, the link member 235 is rotated to vary an effective diameter of the iris 220, and in this state, when the current supply is stopped, the first and second blades 225 and 226 are returned to their original position due to restoring force of the first and second elastic members 229 and 234.

The first and second blades 225 and 226 make a linear reciprocal movement according to rotation of the link member 235. Since a force causing the first and second blades 225 and 226 to rotate about the third and fourth through holes 225c and 226c works, a guide member 221c for guiding the first and second blades 225 and 226 to make a reciprocal movement is required. The guide member 221c is formed on one surface of the second cover 221b and protrudes toward the first cover 221a. The long holes 225d and 226d are formed in the first and second blades 225 and 226 in a reciprocal movement direction of the first and second blades 225 and 226. The reciprocal movement direction of the first and second blades 225 and 226 is a direction perpendicular to a thickness direction of the mobile terminal 100, and a direction extending from the main surfaces of the first and second blades 225 and 226 are formed to be parallel to each other.

The long holes 225d and 226d may be one or more holes, and in FIG. 4, it is illustrated that two long holes 225d and 226d are formed in the first and second blades 225 and 226, respectively. The long holes 225d and 226d do not need to have a curvature and may be formed as rectangular or oval long holes such that the first and second blades 225 and 226 are not released from a linear line by the guide members 221c.

In this manner, since the two long holes 225d and 226d are formed in the first and second blades 225 and 226, respectively, the first and second blades 225 and 226 are restrained from being released from a reciprocal movement line. That is, a force causing the first blade 225 to rotate about the third through hole 225c due to rotation of the link member 235 and a force suppressing the rotation of the first blade 225 by the guide member 221c simultaneously act on the first blade 225, and thus, the first blade 225 makes a linear reciprocal movement. This is the same for the second blade 226. That is, a force causing the second blade 226 to rotate about the fourth through hole 226c according to rotation of the link member 235 and a force suppressing rotation of the second blade 226 by the guide member 221c simultaneously act on the second blade 226, and thus, the second blade 226 makes a linear reciprocal movement.

Meanwhile, in an embodiment of the present disclosure, the camera module 200 further includes a first lens assembly 211 provided on a front surface of the iris 220 and exposed outwardly and a second lens assembly 212 provided on a rear surface of the iris 220 and determining a magnification together with the first lens assembly 211. The first lens assembly 211 is mounted on the first recess portion 221d formed on the front surface of the cover 221, and an adhesive recess 221e for adhering the first lens assembly 211 to the cover 221 is formed around the first recess portion 221d. The adhesive recess 221e provides a space for UV-bonding the first lens assembly 211 to the cover 221, and thus, the first lens assembly 211 is fixedly adhered to the cover 221 through UV bonding.

Similarly, a second recess portion 221i is formed on a rear surface of the cover 221, and the second lens assembly 212 is fixedly UV-bonded to the second recess portion 221i. The first and second recess portions 221d and 221i are formed on the front surface of the first cover 221a and the rear surface of the second cover 221b and formed to be adjacent to the through holes 221j and 221k formed on the first cover 221a and the second cover 221b, respectively.

Zooming or focusing may be performed using the first and second lens assemblies 211 and 212, and here, the first and second lens assemblies 211 and 212 may be miniaturized to be installed in the mobile terminal 100 and enhance assembly characteristics.

The first lens assembly 211 includes a plurality of lenses, and the plurality of lenses are integrally formed through a lens barrel and configured to focus light coming from a subject.

Also, the second lens assembly 212 includes a plurality of lenses integrally formed through a lens barrel, and is configured to magnify or reduce an image formed by light passing through the first lens assembly 211 according to a distance between the first lens assembly 211 and the second lens assembly 212. The plurality of lenses provided in the second lens assembly 212 is configured to compensate for light which has passed through the first lens assembly 211 and the iris 220. Here, a space between the first lens assembly 211 and the second lens assembly 212 is termed an iris room.

The iris 220 is disposed between the first lens assembly 211 and the second lens assembly 212 and adjusts an amount of light incident to an optical system. The through hole 221j is provided on the first cover 221a of the iris 220 and the first lens assembly 211 is inserted into the through hole 221j. The through hole 221j may be equal to or slightly greater than a diameter of the first lens assembly 211. Also, the through hole 221k is provided on the second cover 221b, and the second lens assembly 212 is inserted into the through hole 221k. The through hole 221k may be equal to or slightly greater than a diameter of the second lens assembly 221.

In this manner, the first lens assembly 211 and the second lens assembly 212 are inserted into the iris 220 to form an iris module 290 having an integral structure.

That is, the iris module 290 may include the iris 220, the first lens assembly 211, and the second lens assembly 212. The iris module 290, the actuator 240, and the sensor base 251 has through holes, and the through holes communicate with each other to allow light to be incident therethrough.

Figure 8:
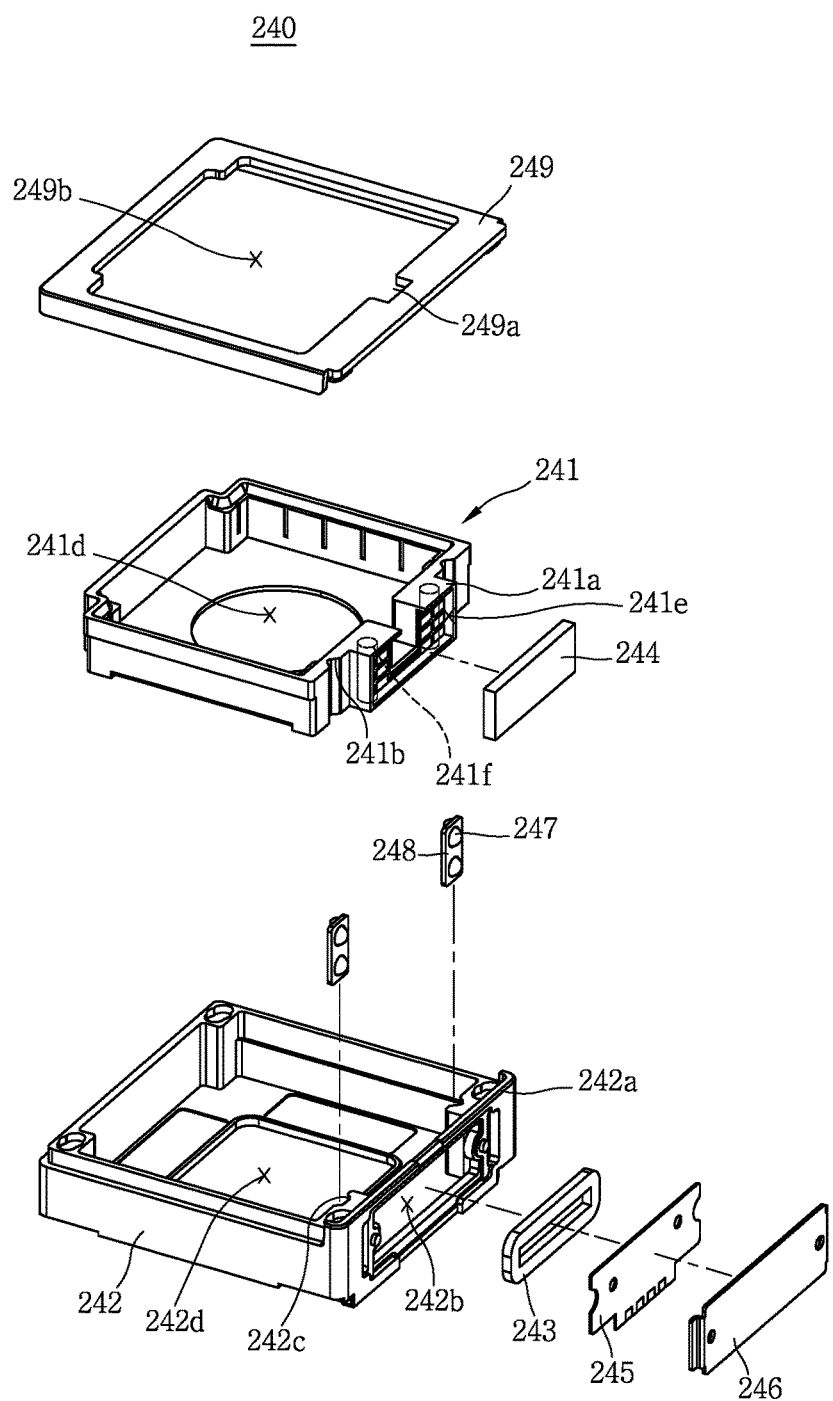
FIG. 8 is an exploded perspective view of an actuator in a camera module according to an embodiment of the present disclosure.

Meanwhile, the camera module 200 according to an embodiment of the present disclosure further includes actuator 240 disposed on a rear surface of the second lens assembly 212 and accommodating the iris 220 therein. FIG. 8 is an exploded perspective view of the actuator 240 in the camera module 200 according to an embodiment of the present disclosure. The actuator 240 performs an auto-focus function, while moving the iris 220 in a thickness direction.

In terms of generating driving force, the actuator 240 may use a voice coil motor (VCM) scheme, a piezoelectric (PZT) scheme, and a rotary motor scheme. The camera module 200 according to an embodiment of the present disclosure uses the VCM scheme, for example. Here, the PZT scheme is a scheme in which a driving element is moved through deformation of a piezoelectric element when a voltage is applied using the piezoelectric element.

Referring to FIG. 8, the actuator 240 includes a moving member (or a carrier) 241, a third magnet 244, a housing 242, a third coil 243, and a second circuit board 245. The moving member 241 has a through hole 241 formed therein and an internal space thereof is confined by a side wall 241a. The moving member 241 accommodates the iris module 290, that is, the iris 220 and the first and second lens assemblies 211 and 212 and reciprocally move the iris 220 and the first and second lens assemblies 211 and 212. The third magnet 244 is provided on one outer surface of the moving member 241, and the third coil 243 is provided in an internal region of a through hole 242b formed on a side wall 242a of the housing 242, disposed to face the third magnet 244, and generates an electromagnetic force causing the moving member 241 to be moved. The housing 242 is formed such that the moving member 241 is accommodated by the side wall 242a, and the through hole 242b is formed in a region corresponding to the third magnet 244. Also, a second circuit board 245 supplying power to the third coil 243 is disposed to be adjacent to the third coil 243. Since the third coil 243 and the third magnet 244 form an electromagnetic force to move the moving member 241, the third coil 243 and the third magnet 244 may be referred to as a driving unit 275, and since the second circuit board 245 controls the actuator 240, the second circuit board 245 may be referred to as an actuator circuit board.

A guide hole 241f is formed in a portion protruding from the side wall 241a, and a protrusion portion (not shown) having a columnar shape formed in the housing 242 is inserted into the guide hole 241f, whereby the moving member 241 and the housing 242 may be coupled to be slidably moved.

The moving member 241 and the housing 242 have a similar shape and substantially have a rectangular shape in which an upper surface thereof is open and through holes 241d and 242d are formed on a lower surface thereof. That is, the moving member 241 and the housing 242 have four side walls 241a and 242a, respectively, and lower surfaces thereof have the through holes 241d and 242d, respectively. Here, the through hole 241d may be formed to be smaller than the through hole 242d. The side wall 242a of the housing 242 is formed to be covered by the housing cover 249. The housing cover 249 has a through hole 249b, and the iris 220 is exposed outwardly through the through hole 249b.

Also, guide recesses 241b and 242c are formed in a vertical direction on one side of a region where the third magnet 244 is provided, in order to provide a space in which a second ball 247 moves slidably. Among the guide recesses 241b and 242c, the first guide recess 241b is formed on an outer surface of the side wall 241a of the moving member 241 and the second guide recess 242c is formed on an inner surface of the side wall 242a of the housing 242. The first and second guide recesses 241b and 242c are formed to face each other. The second ball 247 and a ball housing 248 slidably move on the first and second guide recesses 241b and 242c, thereby minimizing frictional force when the moving member 241 reciprocates.

That is, the moving member 241 and the iris 220 are moved together with the first and second lens assemblies 211 and 212 by a third electromagnetic force generated by the third magnet 244 and the third coil 243. Here, the third magnet 244 may be provided in the moving member 241, and the third coil 243 may be provided in the housing 242. In this case, since the third magnet 244 moves together with the moving member 241, the third magnet 244 is a moving magnet.

Also, the third magnet 244 is provided in a third magnet accommodation portion 241e recessed in the moving member 241, and at least a portion of the third magnet 244 may overlap the side wall 241a of the moving member 241. In this manner, since the third magnet 244 overlaps the side wall 241a of the moving member 241, the camera module 200 may be reduced in width (please refer to FIGS. 9, 11, and 14).

A yoke 246 having a plate shape disposed to cover the through hole 242b of the housing 242 is provided on an outer side of the second circuit board 245. The yoke 246 may be formed of a metal and serves to prevent the third electromagnetic force from being released outwardly to thus increase strength of the third electromagnetic force.

In an embodiment of the present disclosure, as illustrated in FIG. 3, the iris 220 is accommodated in the actuator 240 and the moving member 241 reciprocates apart from the housing 242 to move the iris 220 and the first and second lens assemblies 211 and 212 together, to perform autofocusing (AF) function. That is, in an embodiment of the present disclosure, since the first and second lens assemblies 211 and 212 are integrally formed on the front and rear surfaces of the iris 220, the iris 220, as well as the first and second lens assemblies 211 and 212, move together to perform the AF function.

In this manner, in order to move the iris 220 together, a piezoelectric actuator or an encoder type actuator may be applied. The use of the piezoelectric actuator may cause non-uniformity of a speed of stroke or a distance, and generate noise, and thus, in an embodiment of the present disclosure, the encoder type actuator 240 is applied. However, the actuator is not limited to the encoder type actuator and any component may be used as long as it can move the iris 220 and the lens assemblies 211 and 212 together.

Figure 9:
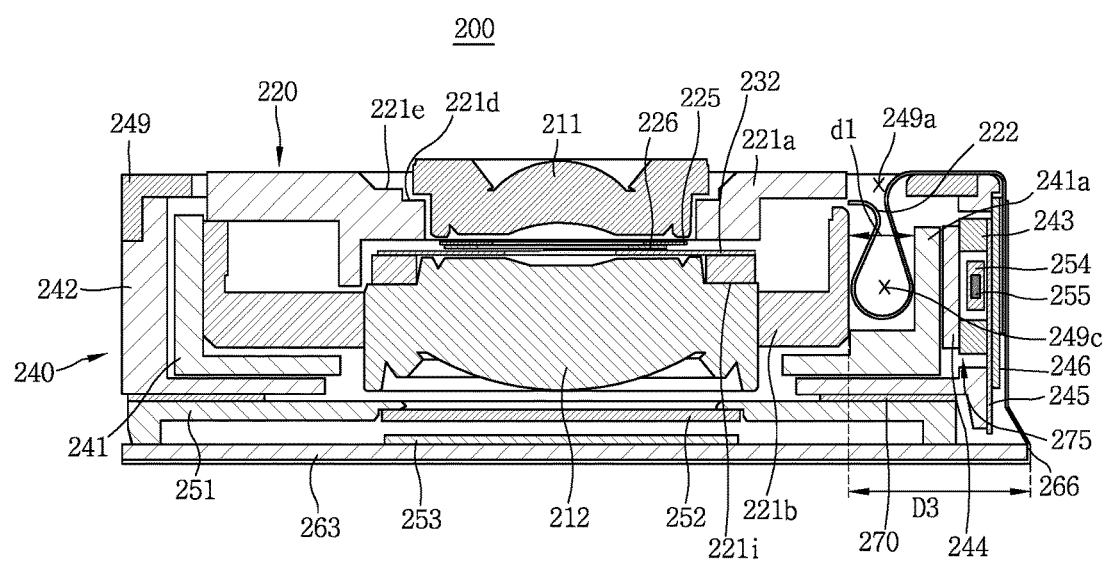
FIG. 9 is a cross-sectional view of a camera module according to an embodiment of the present disclosure.
Figure 11:
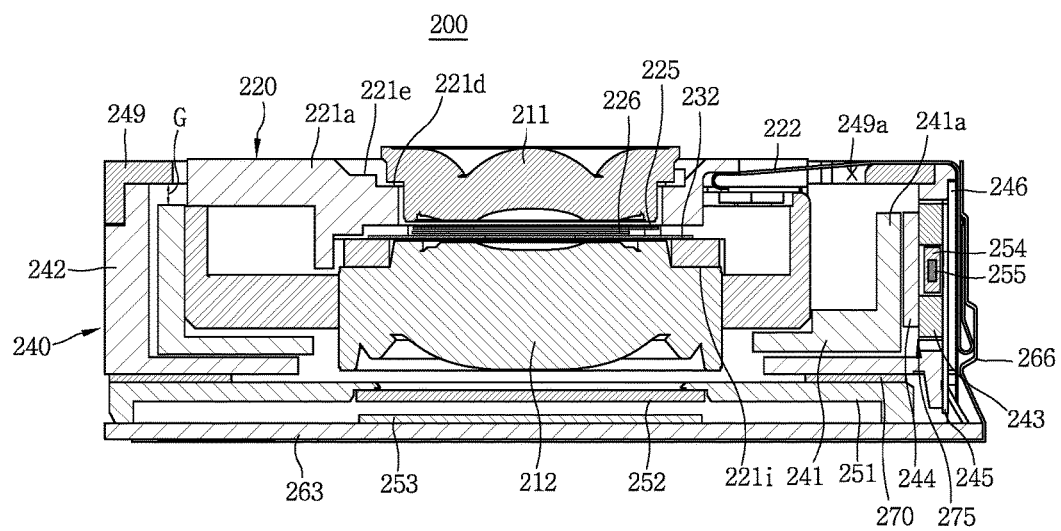
FIG. 11 is a cross-sectional view of a camera module according to an embodiment of the present disclosure.

FIGS. 9 and 11 are cross-sectional views of the camera module 200 according to an embodiment of the present disclosure, taken along line B-B of FIG. 2.

Referring to FIG. 9, the first circuit board 222 extends from an upper side of the iris 220 and is electrically connected to the third circuit board 263 provided on a rear surface of the camera module 200. The third circuit board 263 may be a rigid flexible printed circuit (RFPCB).

As illustrated in FIG. 9, the first circuit board 222 covers a side wall of the iris 220 and extends downwardly, and an insulating tape 266 covering the first board 222 is coupled to a side wall of the housing 242. The insulating tape 266 forms an external appearance of the camera module 200.

An image sensor 253 and a driver chip 264 are provided on the third circuit board 263, and the insulating tape 266 downwardly extends from the side wall 242a of the housing 242 to the third circuit board 263.

Here, as illustrated in FIG. 9, a circuit board accommodation portion 249c accommodating the first circuit board 222 may be formed between an inner wall of the moving member 241 and the iris 220. The circuit board accommodation portion 249c is formed to communicate with a hole 249a formed on the housing cover 249.

One end portion of the first circuit board 222 is connected to the third board 263 provided in a lower portion of the camera module 200, and the iris 220 is lifted and lowered together with the moving member 241, and here, the first circuit board 222 needs to have a sufficient length such that the lifting and lowering movement is not hindered when the lifting and lower movement is made. That is, the iris 220 and the moving member 241 reciprocate in an air gap G illustrated in FIG. 11, and here, the first circuit board 222 may be bent at least one time. A space in which the first circuit board 222 is bent is the circuit board accommodation portion 249c. Here, the lifting and lowering movement refers to reciprocal movement of the camera module 200 toward a rear side when the camera module 200 is installed on the rear side of the mobile terminal 100, or a reciprocal movement of the camera module 200 when the camera module 200 is installed on the front side of the mobile terminal.

Figure 14:
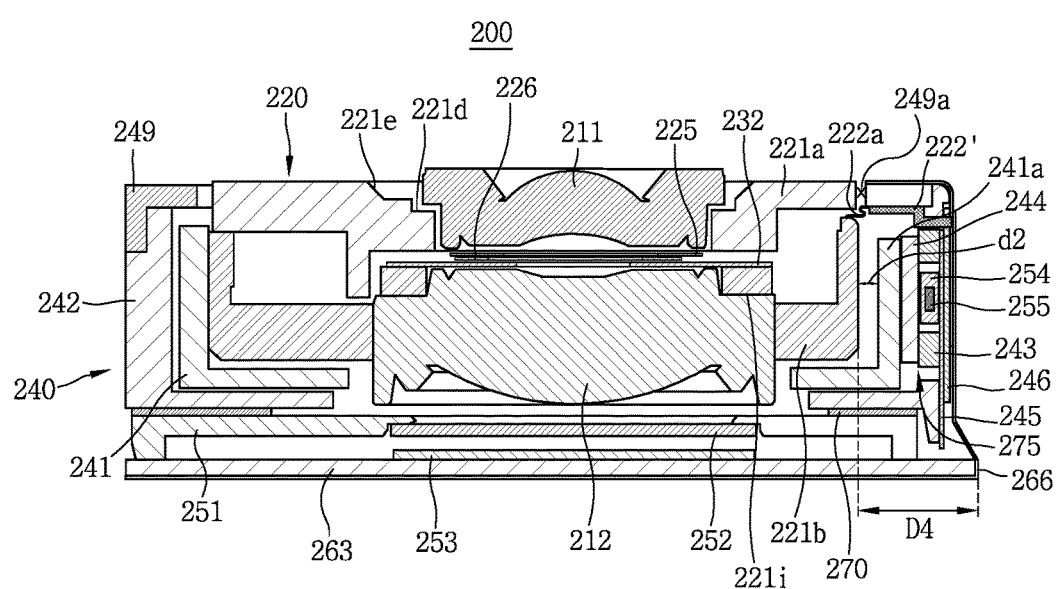
FIG. 14 is a cross-sectional view of a camera module according to an embodiment of the present disclosure.

Also, as illustrated in FIGS. 9, 11, and 14, a driver chip 254 driving the actuator 240 is provided in the second circuit board 245, and a hall sensor 255 is provided within the driver chip 254. Movement of the moving member 241 is sensed by the hall sensor 255, and accordingly, stroke of the moving member 241 may be adjusted. A magnetic member generating a change in a magnetic field sensed by the hall sensor 255 may be disposed on the moving member 241 or may be disposed to be adjacent to the moving member 241.

Figure 10A:
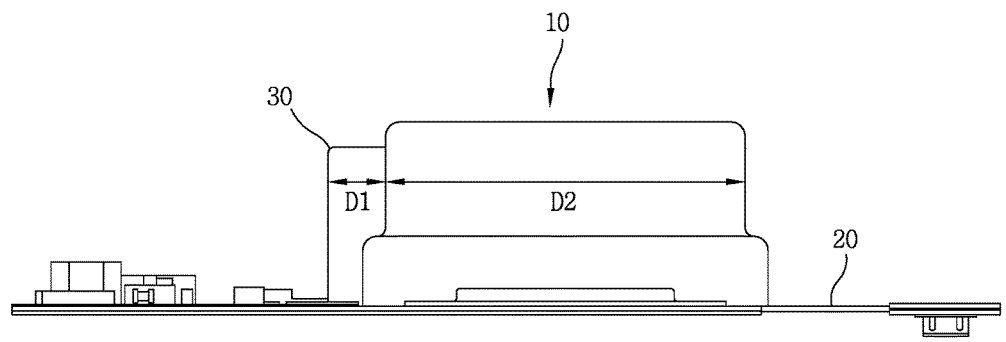
FIG. 10A is a view illustrating a camera module installed on a circuit board according to a comparative example.
Figure 10B:
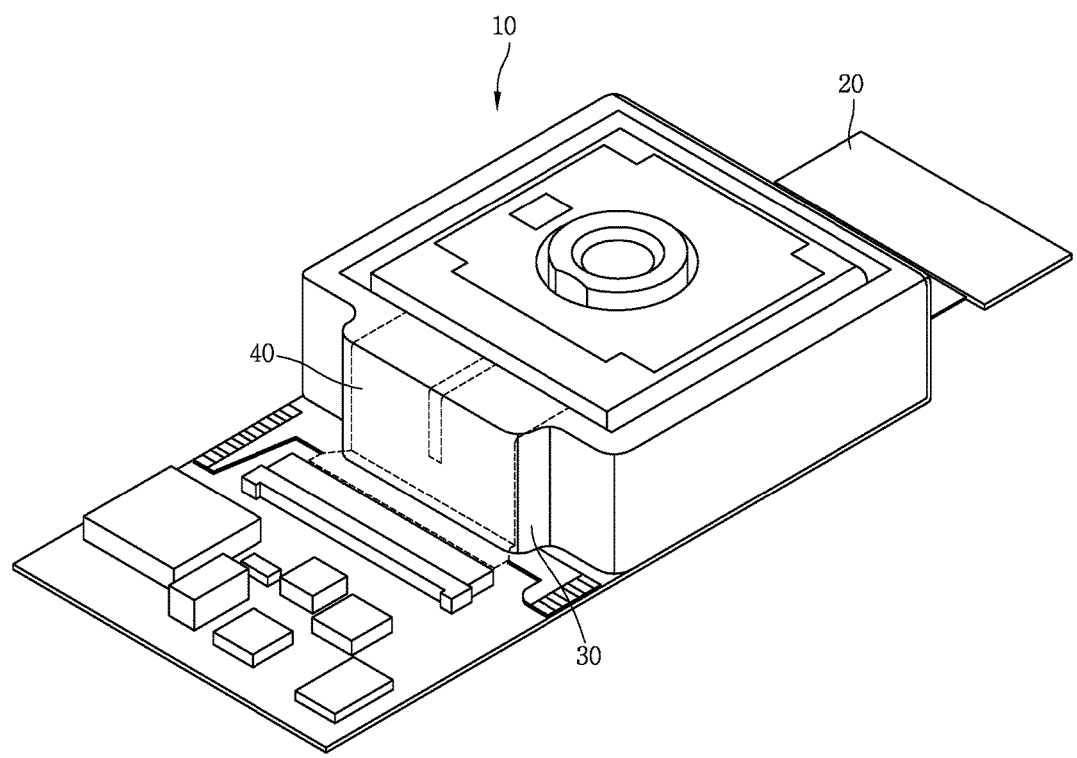
FIG. 10B is a side view of the camera module of FIG. 10A.

FIG. 10A is a view illustrating a camera module 10 installed on a circuit board 20 according to a comparative example, and FIG. 10B is a side view of the camera module 10 of FIG. 10A.

In the related art, the camera module 10 provided in the mobile terminal 100 does not use a variable iris, so only a single circuit board 20 is connected to the camera module 10. In contrast, in order to implement the variable iris 220 according to an embodiment of the present disclosure, a circuit board 40 or driving the variable iris 220 is additionally required. The iris circuit board 40 driving the variable iris 220 is formed to protrude from one side of the camera module 10 and connected to the camera module circuit board 20. The camera module 10 includes an actuator accommodating the iris and reciprocating the iris, and here, the iris circuit board 40 should not affect an operation of the actuator 40. Thus, the iris circuit board 40 is required to be a flexible circuit board, and is bent at least two times so as to be disposed on one side of the camera module 10. A protective cap 30 is formed to cover the iris circuit board 40 in order to prevent exposure of the iris circuit board 40.

In this manner, when the iris circuit board 40 is formed on one side of the camera module 10, a width of the camera module 10 is increased by D1 from D2 as illustrated in FIG. 10B. Thus, another embodiment of the present disclosure proposes a method for reducing a space of the circuit board accommodation portion 249c.

That is, as illustrated in FIG. 9, when the circuit board accommodation portion 249c is formed in the camera module 200, a width of the camera module 200 is increased due to the presence of the iris circuit board 222. Thus, an embodiment of the present disclosure proposes a scheme in which the iris circuit board 222 is disposed on an upper side of the iris 220 and downwardly extends along a side wall of the iris 220 as illustrated in FIG. 11, rather than being bent the plurality of times. In detail, the iris circuit board 222 is not bent to a lower side of the second cover 221b.

Figure 12:
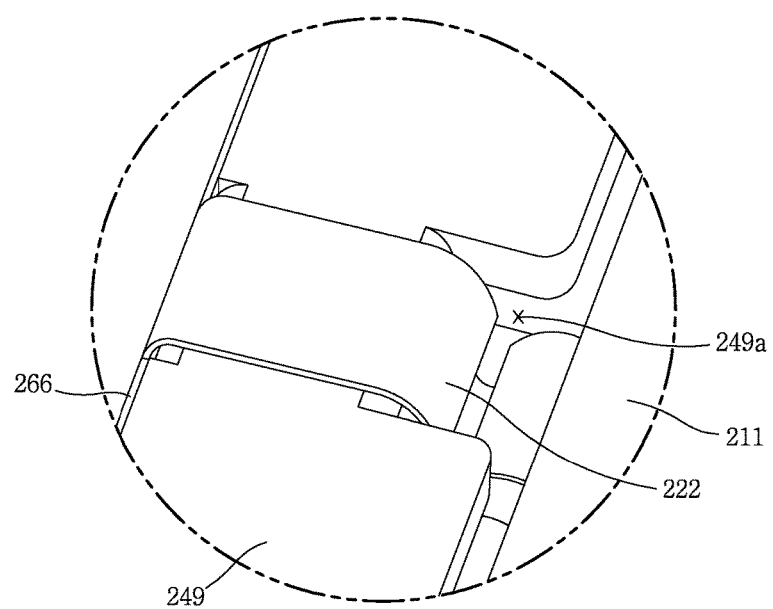
FIG. 12 is an enlarged view of a portion "A" of FIG. 2.

FIG. 12 is an enlarged view of a portion "A" of FIG. 2. As illustrated in FIG. 12, in a region where the iris circuit board 222 is formed, the hole 249a is formed in the housing cover 249 of the actuator 240 in order to allow the iris circuit board 222 to be drawn out along an outer side of the actuator 240 from the iris 220. In this case, however, a foreign object may be introduced through the hole 249a.

Thus, in an embodiment of the present disclosure, as illustrated in FIG. 14, a region in which a circuit board 222a is bent is reduced by using a rigid circuit board 222' instead of the iris circuit board 222. The rigid circuit board 222' may be, for example, a molded interconnected device (MID), and the MID is a sort of circuit board in which an electric circuit and an electronic component are formed on a basic body three-dimensionally without a conventional board. When an electric circuit is directly integrated on a synthetic resin component, an innovative mechatronic assembly component may be effectively manufactured in addition to various advantages in terms of design.

In an embodiment of the present disclosure, since the rigid circuit board 222' is used, a space of the circuit board accommodation portion 249c in which the iris circuit board 222a is formed may be reduced. That is, a distance from an end portion of the iris 220 to an outermost portion of the camera module 200 is D3 in FIG. 9, but since the rigid circuit board 222' is used as illustrated in FIG. 14, the distance from the end portion of the iris 220 to the outermost portion of the camera module 200 is reduced to D4 (<D3). Also, since the circuit board is not visible on the appearance of the camera module 200, aesthetic impression may be enhanced, and since the hole 249a is minimized, introduction of a foreign object to the interior of the camera module 200 may be prevented.

Figure 13:
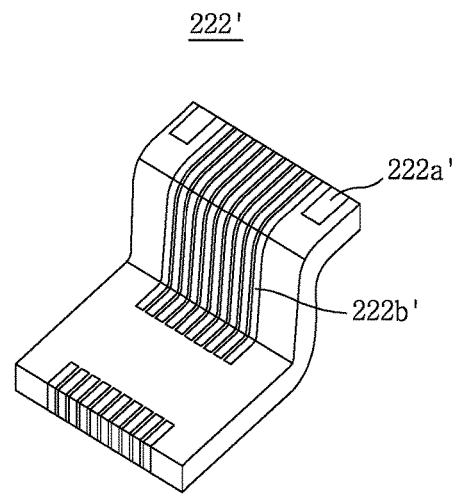
FIG. 13 is a view illustrating an example of a circuit board for an iris according to an embodiment of the present disclosure.

FIG. 13 is a perspective view of the rigid circuit board 222' according to an embodiment of the present disclosure. Referring to FIG. 13, the rigid circuit board 222' has a substantially S shape, in which a connection terminal 222a' is formed on both end portions and a plurality of lines 222b' are formed so as to be connected to the iris 220 and the third circuit board 263. The shape of the rigid circuit board 222' may be varied according to an internal structure of the actuator 240. One side of the rigid circuit board 222' is connected to the iris circuit board 222a by the connection terminal 222a' and the other side thereof is connected to the second circuit board 245.

In addition, when the rigid circuit board 222' is used as the iris circuit board, the hole 249a may be minimized. That is, a distance d1 between an end portion of the iris 220 and the moving member 242 is d1 in FIG. 9, and it can be recognized that the distance therebetween is reduced to d2 (<d1). Also, as illustrated in FIG. 14, when the rigid circuit board 222' is used, the separate circuit board accommodation portion 249c is not required, unlike the case of FIG. 9.

By reducing the space between the moving member 241 and the iris 220, a size of the camera module 200 may be reduced. In this manner, since the iris circuit board 222 is not visible on the appearance of the camera module 200, aesthetic impression may be improved, and since the hole 249a is reduced, introduction of a foreign object may be prevented.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body; and
   a camera module provided on one side of the terminal body and including a lens assembly exposed outwardly in at least a portion thereof, an iris provided on an inner side of the lens assembly to adjust an amount of incident light, and an image sensor provided on an inner side of the iris and converting an optical signal incident through the iris into an electrical signal,
   wherein the iris comprises:
      a cover having a through hole therein and forming an internal space;
      a first blade disposed in the internal space and having a first through hole;
      a first magnet provided on one side of the first blade;
      a first coil formed to face the first magnet and moving the first blade by electromagnetic force generated between the first coil and the first magnet;
      a second blade disposed to overlap the first blade in at least a portion thereof within the internal space and having a second through hole formed to adjust a region in which light is incident through interference with the first through hole;
      a second magnet provided on one side of the second blade;
      a second coil formed to face the second magnet and moving the second blade by electromagnetic force generated between the second coil and the second magnet; and a link member connected to one end portion of each of the first and second blades and varying an aperture of the iris by relatively moving the first and second blades, wherein the cover includes first and second covers coupled to form an internal space, a frame which is coupled to the first and second covers, has a through hole therein, and accommodates the first and second magnets, is provided in the internal space, the first and second blades, the first and second magnets, and the first and second coils are disposed between the first cover and the frame, the link member is disposed between the second cover and the frame, and the iris is implemented to a first state in which current supply is cut off and a second state in which a current is supplied to the iris to change the aperture of the iris.

2. The mobile terminal of claim 1, wherein, in the first and second blades, third and fourth through holes are respectively formed in first and second extending portions extending from one sides of the first and second through holes, and in the link member, first and second protrusion portions are respectively formed in portions corresponding to the third and fourth through holes of the first and second blades, and the first and second protrusion portions respectively penetrate through the third and fourth through holes.

3. The mobile terminal of claim 2, wherein a first ball is disposed between the second cover and the frame, and formed to be in contact with one surface of the second cover and one surface of the frame.

4. The mobile terminal of claim 3, wherein the first and second blades have a long hole formed in a movement direction, and a guide member formed on an inner surface of the second cover and guiding a reciprocal movement of the first and second blades moves within the long hole.

5. The mobile terminal of claim 2, wherein an adjustment plate having a through hole formed therein and having a plate shape is provided between the second cover and the first blade or the second blade.

6. The mobile terminal of claim 2, wherein one end portions of the first and second protrusion portions are inserted into a long hole formed in the first cover and having a predetermined curvature, and move within the long hole.

7. The mobile terminal of claim 2, wherein a third protrusion protrudes from a portion as a center of rotation of the link member toward the first cover, and restoring force is provided to the link member by an elastic member having one end portion fixed to the third protrusion portion and the other end portion fixed to the frame.

8. The mobile terminal of claim 1, wherein a first circuit board is provided in the internal space of the cover, and a hall sensor sensing movement of the first and second blades is provided on the first circuit board.

9. The mobile terminal of claim 8, further comprising:

a first lens assembly provided on a front surface of the iris and exposed outwardly;

a second lens assembly provided on a rear surface of the iris and determining a magnification together with the first lens assembly; and an actuator disposed on a rear surface of the second lens assembly and accommodating the iris.

10. The mobile terminal of claim 9, wherein the actuator comprises:

a moving member having a through hole formed therein and having an internal space confined by a side wall;

a third magnet provided on the side wall of the moving member;

a housing formed to accommodate the moving member by the side wall and having a through hole formed in a region corresponding to the third magnet;

a third coil disposed to face the third magnet in a internal region of the through hole of the housing and generating an electromagnetic force; and a second circuit board supplying power to the third coil.

11. The mobile terminal of claim 10, wherein the moving member and the iris are moved together with the first and second lens assemblies by an electromagnetic force generated by the third magnet and the third coil, and first and second guide recesses are respectively formed on an outer side wall of the moving member and an inner side wall of the housing in a thickness direction, and when the moving member moves, a second ball slidably moves in the first and second guide recesses.

12. The mobile terminal of claim 8, wherein the first circuit board is branched to supply a current to each of the first and second coils.

13. The mobile terminal of claim 1, wherein the aperture of the iris becomes gradually smaller or gradually greater as a magnitude of a current applied to the first and second coils is increased.

14. The mobile terminal of claim 1, wherein the first and second blades relatively move when the link member rotates centered on the link member itself.

15. The mobile terminal of claim 1, wherein directions of currents applied to the first and second coils are opposite to each other.

16. The mobile terminal of claim 1, wherein the first and second magnets are respectively disposed to be adjacent to the long holes formed in the first and second blades, and do no overlap the first and second blades.

17. The mobile terminal of claim 1, wherein the link member comprises:

a first link member connected to the first blade; and a second link member connected to the second blade, wherein the first and second link members are individually driven.

* * * * *